June 29, 1948.  J. S. HASBROUCK  2,444,227
PROPELLER DRIVE

Filed Dec. 14, 1944  7 Sheets-Sheet 1

Fig.1

INVENTOR
John S. Hasbrouck
BY Charles L. Shelton
ATTORNEY

June 29, 1948.  J. S. HASBROUCK  2,444,227
PROPELLER DRIVE
Filed Dec. 14, 1944  7 Sheets-Sheet 5

INVENTOR
John S. Hasbrouck
BY Charles L. Shelton
ATTORNEY

June 29, 1948.  J. S. HASBROUCK  2,444,227
PROPELLER DRIVE
Filed Dec. 14, 1944  7 Sheets-Sheet 7

INVENTOR
John S. Hasbrouck
BY Charles L. Shelton
ATTORNEY

Patented June 29, 1948

2,444,227

UNITED STATES PATENT OFFICE 2,444,227

PROPELLER DRIVE

John Stephen Hasbrouck, Glastonbury, Conn., assignor to United Aircraft Corporation, East Hartford, Conn., a corporation of Delaware Application December 14, 1944, Serial No. 568,108

9 Claims. (Cl. 74—371)

This invention relates to aircraft propeller drives and particularly to a multi-speed transmission between the engine main shaft and the propeller shaft, and means for changing the speed ratio of the transmission.

The invention relates more specifically to means for effecting changes in the speed ratio between an aircraft engine main shaft and the propeller shaft driven thereby so that a change in the speed of the propeller relative to that of the engine may be effected quickly by power actuated means during the continuing rotation of the engine and propeller.

In certain types of modern airplanes having high maximum speeds and relative heavy wing loadings, it has been found desirable to provide means for changing the gear ratio between the engine and the propeller. For example, in some installations it may be found desirable to operate the propeller at a very high rotational speed and with the blades adjusted for relatively low pitch angle during take-off in order to develop the necessary tractive thrust while the airplane is travelling at relatively slow speeds. As the speed of the airplane increases it is desirable to operate the propeller at a slower speed relative to engine speed, with the blades adjusted for a higher pitch angle. In other installations it may be desirable to operate the propeller at a lower speed relative to engine speed during take-off than in cruising. Various reasons for utilizing such change speed gear drives between the engine and the propeller are known to the prior art and do not in any way affect the scope of the invention.

An object of this invention is to provide improvements in multi-speed reduction gear drives for aircraft propellers, whereby two or more thousand horsepower may be transmitted efficiently from an aircraft engine to a propeller through a selected one of at least two different speed ratios, in which the change from one speed ratio to another is effected by power means rapidly, positively and dependably with minimum loss of power; and in which the shifting mechanism may be remotely controlled and is substantially foolproof.

Another object is to provide means, when shifting the driving connections between the engine and propeller shafts from one speed ratio to the other, to move an actuator or intermediate member forming a member of the driving connections resiliently from one operative or driving position to another and with a snap action in either direction.

Another object of the invention is to hydraulically actuate the speed changing device, the hydraulic connections for this purpose also acting to reset the engine governor.

Further objects are to provide an improved synchromesh mechanism for a multi-speed propeller reduction gear and to prevent overspeeding of the engine during the gear shifting operation.

Other objects and advantages will be apparent from the specification and claims and from the drawings which illustrate what is now considered to be a preferred embodiment of the invention.

In its preferred form, the invention may include the following principal parts: First, a main driving shaft such as the main crankshaft of an aircraft engine; second, a propeller shaft mounted coaxial therewith; third, a driving member rotatable with said main driving shaft and having splines or teeth formed on its periphery fourth, a shiftable ring; member having teeth on its inner and outer peripheries and slidably movable over the teeth of the driving member; fifth, intermediate gears supported for rotation coaxially with said main shaft and having different numbers of gear teeth on their peripheries and having internal splines meshing selectively with the splines on the outer periphery of the shifting ring member; sixth, a plurality of pinion carrying intermediate shafts arranged in a circular series about the main shaft and extending parallelly thereto, pinions on said shafts meshing with the above referred to intermediate driving gears; seventh, a driving pinion provided on each of said pinion shafts; eighth, a main driven gear keyed or splined directly to said propeller shaft and engaging said driving pinions; ninth, hydraulic means for actuating the speed changing mechanism, to move said shifting ring member from one position to another; and tenth, means to reset the propeller governor while the change in speed ratio is being effected.

Referring more in detail to the figures of the drawings, there is shown a small part only of a complete engine crankcase 10 and the forward end only of the engine crankshaft 12. This crankshaft 12 forms the main driving shaft for the propeller 14 of an airplane and is rotatably mounted in a front bearing 16 within the casing 10. Coaxial with the crankshaft 12 and extending within a portion thereof is the propeller shaft 18 having the propeller 14 (shown diagrammatically only) secured to its forward end, the propeller shaft 18 being supported within one or more anti-friction bearings 20 suitably mounted within a frame or housing 22 which may be bolted to the crankcase 10 and which may enclose the speed change device presently to be described.

The propeller shaft 18 is also supported by having its engine end extended within the forward end of the main shaft 12, suitable bearings 19, 21 being provided therein to permit relative rotation of the two shafts.

Mounted on the splined forward end of the crankshaft 12 is a driving member in the form of a thin sleeve 24 having internal longitudinally extending splines 25 adjacent its rear end engaging the splines 23 on the crankshaft, there being external splines 27 or teeth on the sleeve 24 adjacent its forward end. Engaging the external splines or teeth 27 at the forward end of this sleeve 24 are internal splines 29 on the rear of a ring member 26. This ring member 26 is supported by means of a collar member 28 rotatably mounted on the propeller shaft 18 forward of the shaft 12. This ring gear member 26 is, therefore, supported by the sleeve member 24 engaging its internal splines 29 and by the collar 28 rotatably supported by an intermediate cylindrical portion of the propeller shaft 18.

Figure 1:
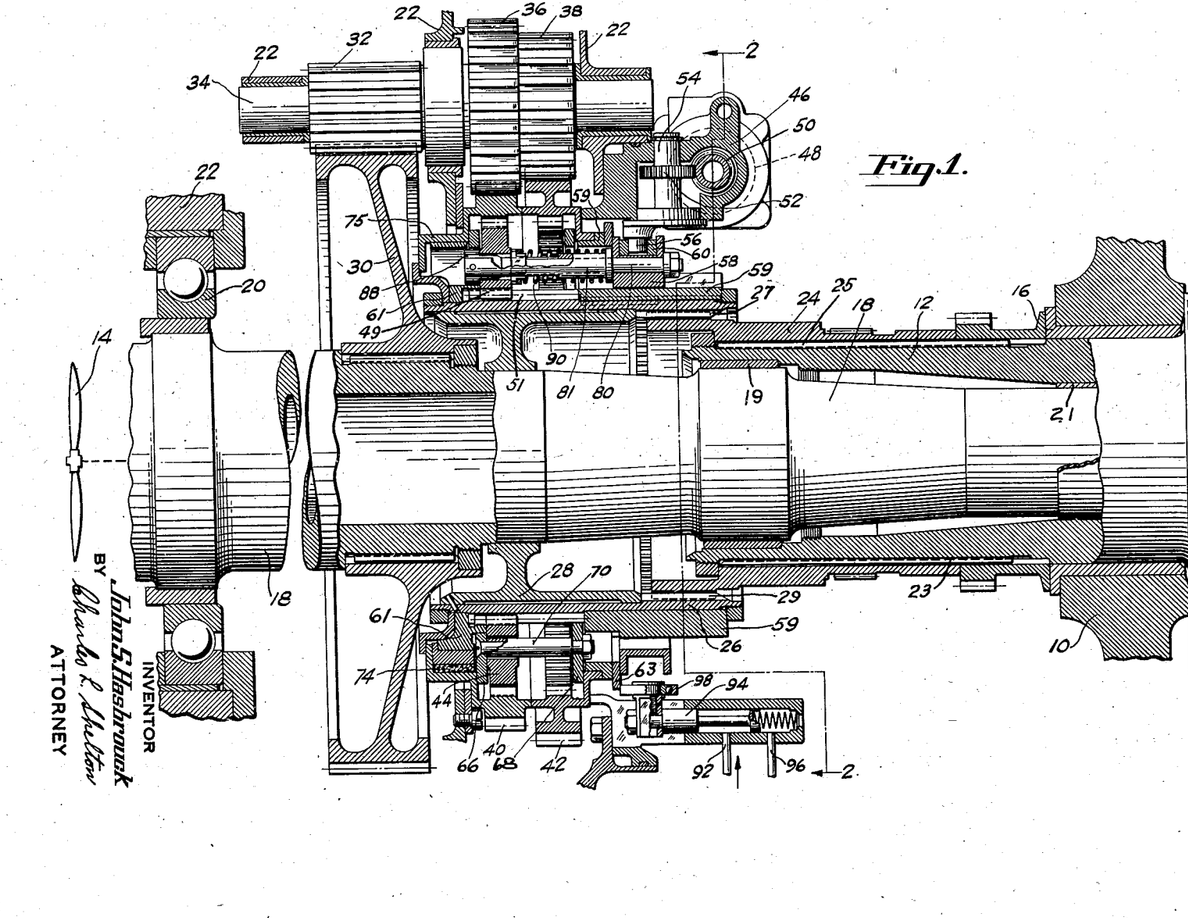
Fig. 1 is a longitudinal sectional view of a speed changing mechanism illustrating the present invention, the section being taken substantially on the planes of broken line 1—1 in Fig. 2.
Figure 3:
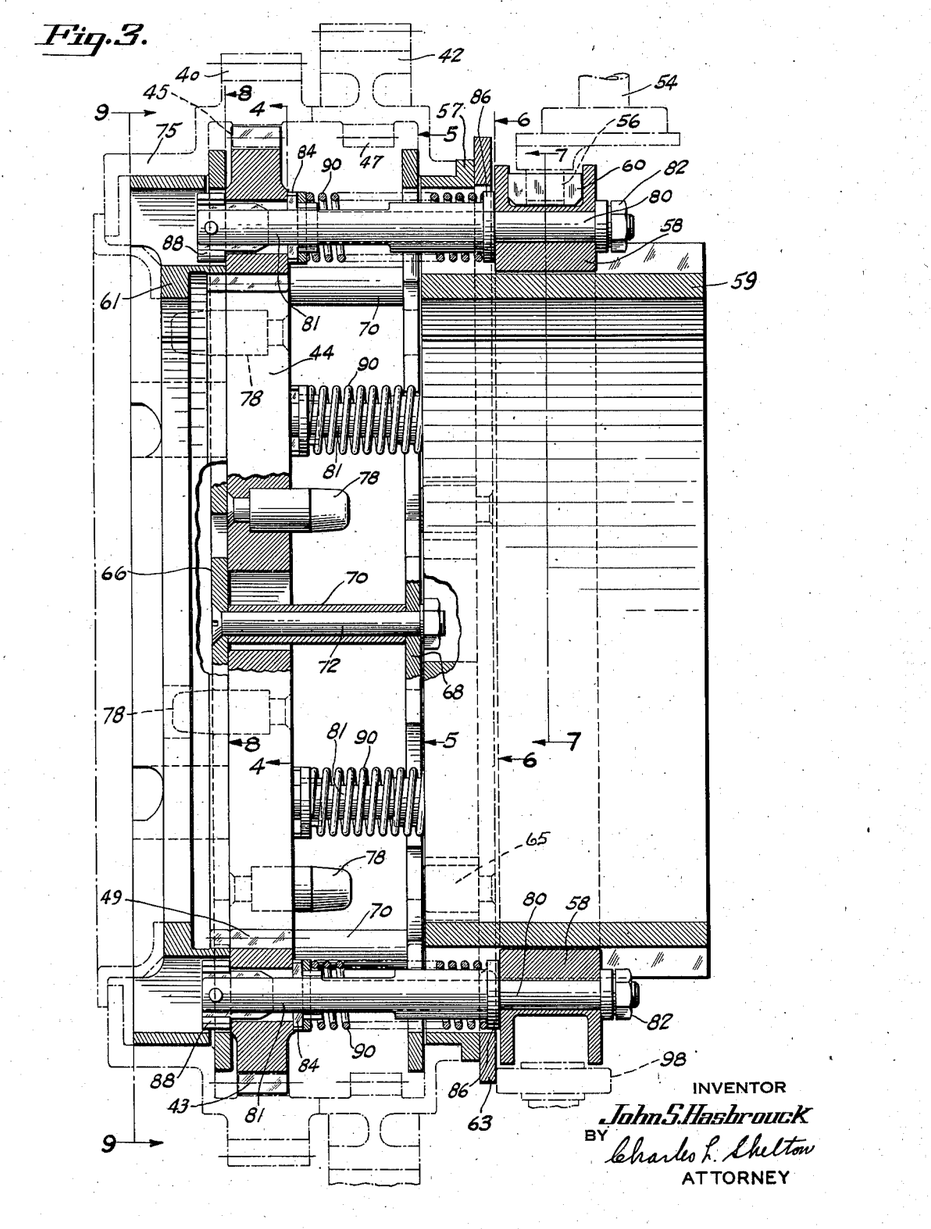
Fig. 3 is a longitudinal elevation in section of the shifting member and adjacent parts connected therewith shown on an enlarged scale from Fig. 1.
Figure 4:
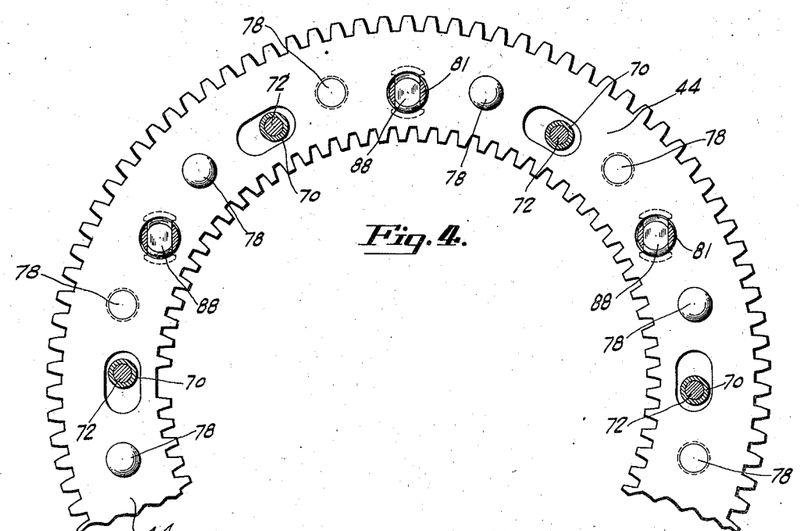
Fig. 4 is a view of a part of the shifting member and adjacent parts taken on the plane of line 4—4 in Fig. 3.
Figure 5:
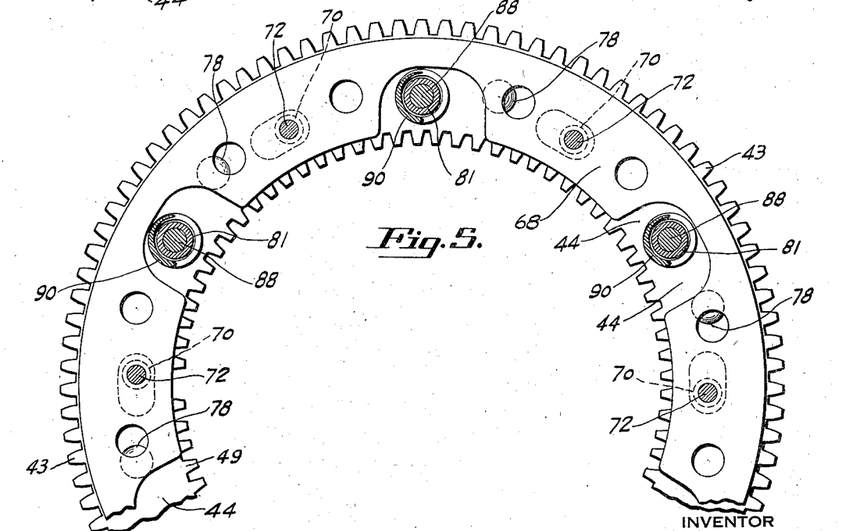
Fig. 5 is a similar view taken on the plane of line 5—5 in Fig. 3.
Figure 6:
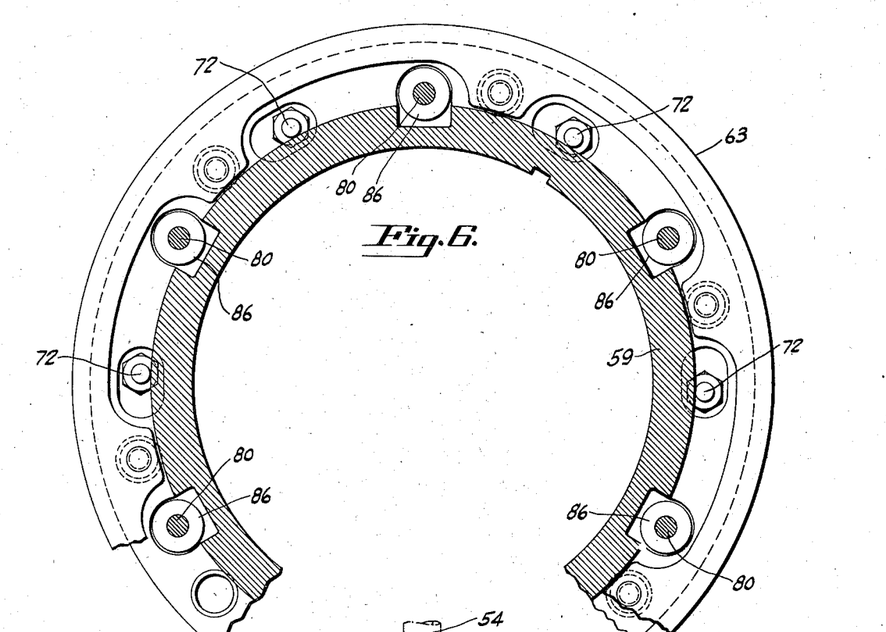
Fig. 6 is a view similar to Fig. 5 taken on the plane of line 6—6 in Fig. 3.

On the propeller shaft 18 at an intermediate portion is a large driven gear 30 keyed or splined in fixed position thereon and having its teeth meshing with the teeth of a plurality of pinions 32 on the forward portions of short intermediate shafts 34 arranged in a circular series about the propeller shaft 18 and rotatably mounted within suitable bearings provided therefor in the frame or housing 22. As shown in Fig. 1, each of the pinion shafts 34 is provided with three aligned bearings formed in the frame 22, the driving pinions 32 meshing with the gear 30 on the propeller shaft 18 being disposed between the forward and intermediate bearings. Pinions 36 and 38, which are of different diameters for driving the shafts 34 at either of two speeds, are disposed between the intermediate and rear bearings. The pinions 36 and 38 are positioned adjacent each other on shaft 34 and are continuously in mesh with the intermediate ring gears 40 and 42, respectively. As best shown in Fig. 3, gear 42 is rotatably supported concentrically of the crankshaft 12 on an annular flange 57 integral with an annular member 59 keyed to the sleeve 26. Gear 40 is rotatably mounted in a like manner on a ring 61 splined to the front end of sleeve 26.

To operatively connect one of these gears 40 or 42 drivingly to the main crankshaft 12, an axially slidable annular member 44 is provided having teeth or splines on its outer and also on its inner periphery. The teeth 43 on the outer periphery of the shifting member 44 mesh selectively with corresponding teeth 45 and 47 on the inner periphery of one or the other of the intermediate or ring gears 40 or 42, depending upon the operative position to which the shifting ring member 44 has been moved. The teeth 49 formed on the inner periphery of the ring member 44 engage at all times the elongated splines 51 on the outer surface of the driving member 26. With the shifting member 44 in one of its operative positions, one speed reduction is effected between the crankshaft 12 and propeller shaft 18 by the gears 40, 36 and when the ring member 44 has been axially moved to its other operative position, another reduction ratio is obtained by gears 42, 38.

Figure 7:
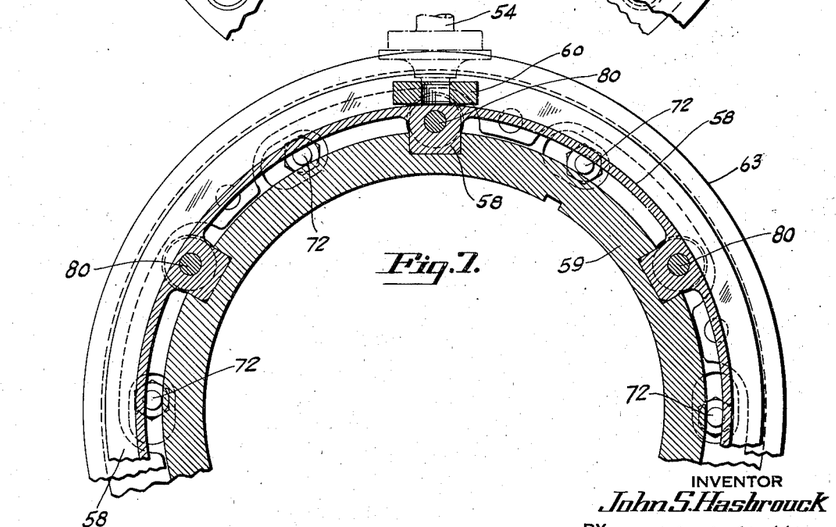
Fig. 7 is a view similar to Figs. 5 and 6 taken on the plane of line 7—7 in Fig. 3.

Movement of this shifting member 44, in either direction is effected hydraulically, preferably by admission of fluid under pressure to one end or the other of one or more cylinders 46 within which pistons 48 are reciprocable. Each piston 48 is provided at its intermediate portion with a plurality of rack teeth 50 each rack meshing with a small spur gear 52. Each of the small gears 52 is mounted adjacent its piston on a short rotatable shaft 54 supported within the housing 22. On each of these shafts 54, at one end, is provided an eccentric or crank 56, which engage at their outer or free ends within a peripheral groove formed in an anular actuating member 58. The actuating member 58 may be slidably mounted on a member 59 provided with axially extending slots (Fig. 7) so that the member 58 will be rotated with member 59, sleeve 26, and the engine shaft 12.

Each of the crank pins 56 is surrounded by a bearing member or shoe 60 directly engaging the side walls of the groove in the actuating member 58. In one position of the pistons 48, the ring member 58 is in one extreme position and in the opposite position of the pistons 48, the eccentrics or cranks 56 have been rotated slightly more than one hundred and eighty degrees and have moved the ring member 58 to its opposite extreme position. Fluid under pressure is admitted to corresponding ends of the cylinders 46 within which pistons 48 operate through appropriate conduits 97, 102 from a manually controlled valve 62 presently to be described.

The annular member 44 may be guided and supported as shown upon the sleeve member 26 rotatable with the main shaft and is resiliently connected to its shifting member 58 through springs 90. By means of this resilient connection, the shifting member 58 may move from one operative position to its other extreme position by its hydraulic actuating means without necessitating immediate corresponding movement of the ring member 44.

Referring to Figs. 3 et seq., it will be seen that the ring member 44 has outstanding, laterally from one side, a plurality of two part bolts 80. The member 58 is slidable over one of the bolt sections 80 and is forced resiliently in one direction or the other by movement of the actuating crank 54. Supported by the members 61, 26 in a manner to permit sliding movement of the shifting or ring member 44 to its operative positions, is a gate ring comprising two separated flat annular members 66 and 68 held spaced apart a fixed distance by sleeves 70 shown in Fig. 3 disposed between the members 66 and 68 and held in fixed relation thereto by bolts 72 extending through the sleeves 70 and transversely through the members 66 and 68. A slot is provided in ring 44 for each bolt 72 and sleeve 70, thus permitting limited relative angular movement between the gate ring and the shifting member 44.

Figures 8, 9:
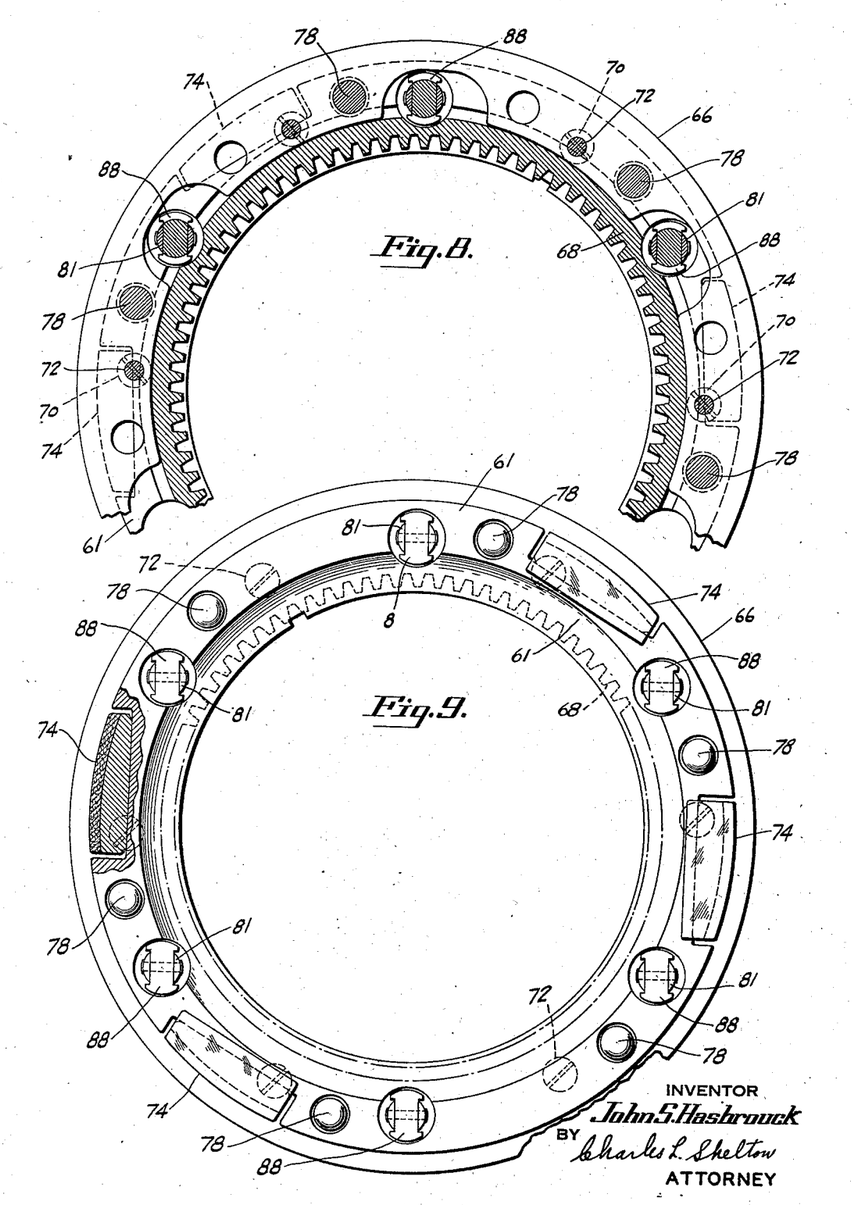
Fig. 8 is a view similar to Figs. 5 and 6 taken on the plane of line 8—8 in Fig. 3.
Fig. 9 is a view similar to Figs. 5 and 6 taken on the plane of line 9—9 in Fig. 3.

The frictional driving means for the intermediate ring gears 40 and 42 and the members rotating with them comprise clutch shoes 74 best shown in Fig. 9 inserted within recesses in the ring 61 on one side of the ring member 66. When this inner member 66 and the member 61 adjacent thereto rotate faster than the gear 40, the shoes 74 engage a flange 75 formed on the gear 40 at one side and frictionally drive the gear 40 at the same speed as the inner member. The inner member 61 always rotates at the same speed as the engine shaft 12 for the reason that it is always directly connected therewith. When the inner member 61 rotates slower than the ring gear 40 frictional members 74 are disengaged and the gears 40 and 42, driven by the propeller, slow down slightly to correspond to the speed of the inner member 66 driven by the engine.

Extending from opposite side faces of the ring or shifting member 44 are pins 78 arranged in concentric circular series. When the ring member 44 is in one or the other of its operative positions, in which it drives one or the other of the gears 40, 42, the pins 78 on one side engage corresponding openings within the annular members 66 or 68 of the gate ring, which is driven through bolts 72 and sleeve 70 by shifting member 44. When the member 44 is in mid-position the gears 40, 42 are free to rotate with the propeller 14 by their own momentum, or are frictionally driven by friction shoes 74 whenever the speed of sleeve 26 exceeds the speed of gear 40.

While the ring shifting member 44 is in its central or neutral position, the propeller shaft 18 is not being positively driven and during this period the frictional drive provided by clutch shoes 74 prevents overspeeding of the engine and helps to synchronize the speeds of gear 40 and shifting ring 44. As described below, the pin 78 outstanding from the shifting member 44 become aligned with openings provided for them in the rotating gate members 66 or 68 only when the speed of the shifting member 44 is approximately equal to the speed of the corresponding gear 40 or 42, so that the shifting member 44 may then move into its extreme or operative position smoothly and with a snap action to provide a positive gear drive between the engine and propeller shafts 12 and 18, respectively.

Outstanding from one side of the actuating member 58 and extending transversely through the gate ring formed by members 66 and 68 are two part bolts each of which comprise two principal elongated members 80, 81. The shanks of each of the bolt members 80 extend freely through holes provided in the actuating member 58. These bolt members 80 passing through the actuating member 58 have nuts 82 threaded on their ends and on their opposite ends are each provided with an integral head 84. Telescopically disposed relative to these bolt members 80 for movement coaxially therewith are sleeve bolt members 81 having integrally formed heads 86 at one end and attached heads 88 at their opposite ends. Portions of the periphery of these sleeve bolt members 81 are cut away to form slots permitting movement of the heads 84 formed on the inner bolt members 80. The actuating member 58 is disposed between the integral head 86 of the sleeve bolt member 81 and the nuts 82 on the inner bolt member. Between the integral heads 84 and 86 of the two bolt members and surrounding the intermediate portions of the bolts are disposed compressed coil springs 90 forcing the heads apart as far as permitted by the assembly.

Between the attached heads 88 of the sleeve members 81 and the integral heads 84 of the inner bolt members 80 is the shifting member 44, the operation of which will presently be more fully described. It is by resilient movement of this shifting member 44 by member 58 that the driving connections for the two gears 40 and 42 are shifted.

Movement of the actuating member 58 in one direction (to the right as seen in Fig. 3) by its previously described hydraulic mechanism pulls the inner bolt member 80 to the right and compresses the coil springs 90 disposed between the heads 84 and 86. This pressure of the springs 90 will be exerted in a direction to resiliently force the sleeve bolt member 81 to the right which will also force the ring member 44 toward its right hand position. Movement of the actuating member 58 toward the left engages the member 58 with flange 86 and compresses the coil springs 90 by movement to the left of the sleeve bolt member 81. Movement to the left of the ring member 44 then occurs which extends the coil springs 90 and moves the inner bolt members 80 to the left.

In the two operative positions of shifting member 44 the outer splines or teeth thereon engage within corresponding internal splines on either of the two alternately used driving gears 40 or 42 and the pins 78 are disposed within the corresponding holes in either of the members 66, 68 of the gate ring. Between the gears 40 and 42 is a space within which the member 44 when moved from one operative position to the other is entirely out of contact with either gear 40 or 42. In this mid-position studs 78 are disengaged from plates 66 and 68.

Figure 12:
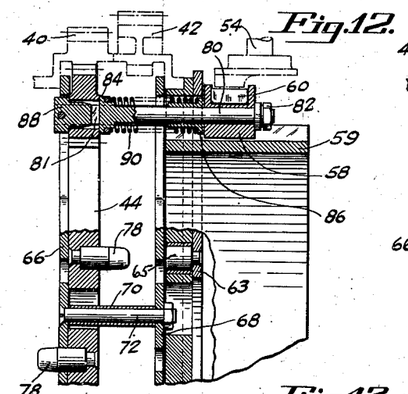
Figure 13:
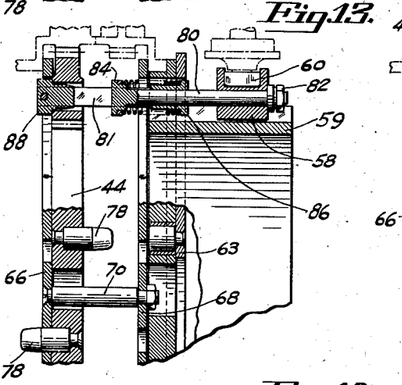
Figure 14:
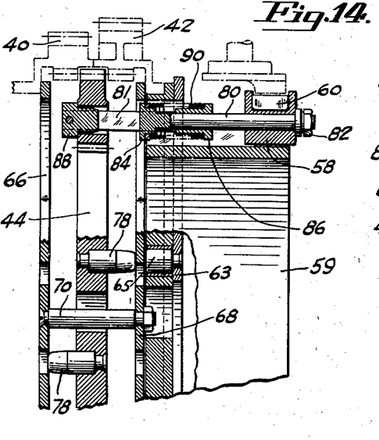

By reference to Figs. 12 et seq., the sequence of operation of the shifting mechanism for the member 44 will be clear. Fig. 12 shows the shifting member 44, positioned for the lower speed ratio for the propeller. When the actuator member 58 is moved to the right from the position shown in Fig. 12 by the pistons 48, its first effect is to compress the springs 90 between the heads on the two bolt members 80 and 81 as shown in Fig. 13. The first part of the movement of member 58 partially compresses springs 90 but disengagement of member 44 is not accomplished until actuator member 58 continues from the position shown in Fig. 13 to the position shown in Fig. 14. At this time the springs 90 are solidly backed or compressed between the members 84 and 86 thus creating a positive pull on the bolt members 81 and shifting ring 44 by pistons 48. To facilitate release of the spline connection between shifting member 44 and gear 40, the throttle may be manually operated to at least momentarily release the load being transmitted through these splines, enabling the energy previously stored up by compression of springs 90 to quickly disengage the shifting member from the low speed gear 44 and move it to the neutral or non-driving position shown in Fig. 14, which also permits the actuating ring 58 to move to its extreme right hand position. Further movement of the shifting ring 44 is prevented, however, because the right hand set of the pins 78 and their corresponding holes are misaligned with respect to the left hand set of pins 78 and their corresponding holes as shown in Fig. 3 and Fig. 14, and consequently the pins 78 strike against portions of the right hand member 68 of the gate ring, preventing immediate engagement of the teeth on member 44 with the splines on gear 42. As the gear 42 is rotating slower than gear 40 at the moment the member 44 is disengaged from gear 40, this misalignment of the two sets of pins and holes prevents clashing or breakage that would otherwise result from an attempt to positively lock together the engine and propeller masses with parts rotating at different speeds.

Figure 15:
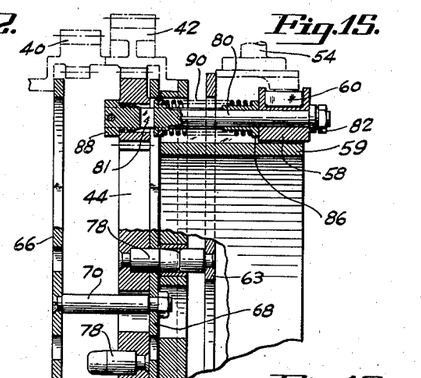

In the neutral position shown in Fig. 14 the springs 90 still urge the shifting member 44 to the right, causing pins 78 to press member 68 against the inner flange on gear 42, thus creating a frictional drag which tends to cause member 68 to rotate at the speed of gear 42. Thus as long as gear 42 is rotating slower than shifting member 44 the sleeve 70 of the gate ring will be held against that side of the slot in member 44 in which the right hand set of pins 78 are not aligned with the holes in gate member 68. But as the speed of the engine is reduced the sleeves 70 will be dragged over against the other side of the slots in shifting member 44 at the instant the speeds of the shifting member and the gear 42 cross and when this occurs the right hand set of pins 78 become aligned with the holes in gate member 68 and springs 90 cause the shifting member to instantly snap into its high speed driving position, as shown in Fig. 15. In actual practice the shift is made very rapidly, merely by opening a valve to admit actuating fluid to the cylinders 46 and then manually varying the throttle position one or more times. The shifting mechanism then acts first to disengage the low speed gear 40 and then to snap the shifting member into the high speed position at the instant its speed becomes synchronized with the speed of high speed gear 42. The shifting member 44 remains momentarily only in its neutral or non-driving position and is then moved to its new operative position with a snap action. The propeller will then be positively driven at its higher speed ratio.

Figure 16:
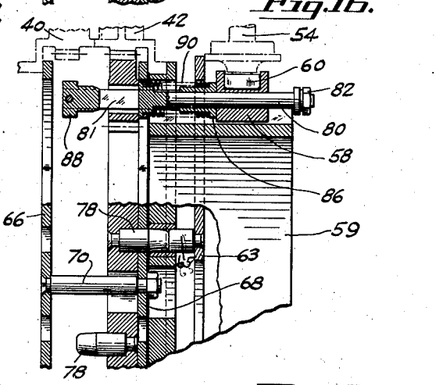

Fig. 16 shows the reverse operation of the change speed mechanism in which the actuating member 58 has been returned to its mid-position by pistons 48 to again compress the springs 90 and resiliently force the member 44 toward the left.

Figure 17:
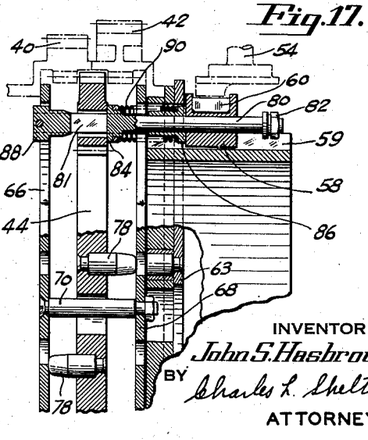

Fig. 17 shows the actuating member 58 after having moved to its extreme left hand position and with the shifting member moved to its mid or inoperative position. From the position shown in Fig. 17, the shifting member 44 is moved to its left hand position as shown in Fig. 12 as soon as the openings in plate 66 are aligned with the pins 78, in a manner similar to that described above. In the shift from high to low, the engine speed is increased relative to propeller speed when the shift is made. Clutch elements 74 are particularly important during this process to prevent overspeeding of the engine.

At the time the shift from low to high speed is effected it may be desirable to also reset the propeller 14 to a different speed. For this purpose movement of the lower piston 48 to move the actuating member 58 from its low to its high speed position uncovers port 92 in the lower cylinder 46 so that when the pistons 48 have moved a portion of their travel and the shifting member 44 is about to be moved to its central or neutral position, fluid under pressure is admitted from line 102 through line 92 to valve 94.

To open the valve 94 at the proper time to admit fluid under pressure to the governor by conduit 96, rollers 98 are provided on spring pressed plungers which urge ring 63 to the left, the lower plunger 94 being also formed as a valve as shown in Fig. 1. When shifting member 44 snaps into its high speed position, the right hand set of pins 78 contact correspondingly spaced buttons 65 on ring 63 and force the ring 63 and rollers 98 to the right, causing valve 94 to admit pressure fluid from line 92 into line 96 leading to the governor reset mechanism. In the lower speed ratio position of Fig. 1, valve 94 is held in the position shown in which line 96 is opened to drain. Thus the propeller governor is reset by valve 94 to either higher or lower speed settings as the shift is made, in a manner more fully explained in United States Patent No. 2,365,204, granted December 19, 1944, to Erle Martin et al., assigned to applicant's assignee.

Figure 2:
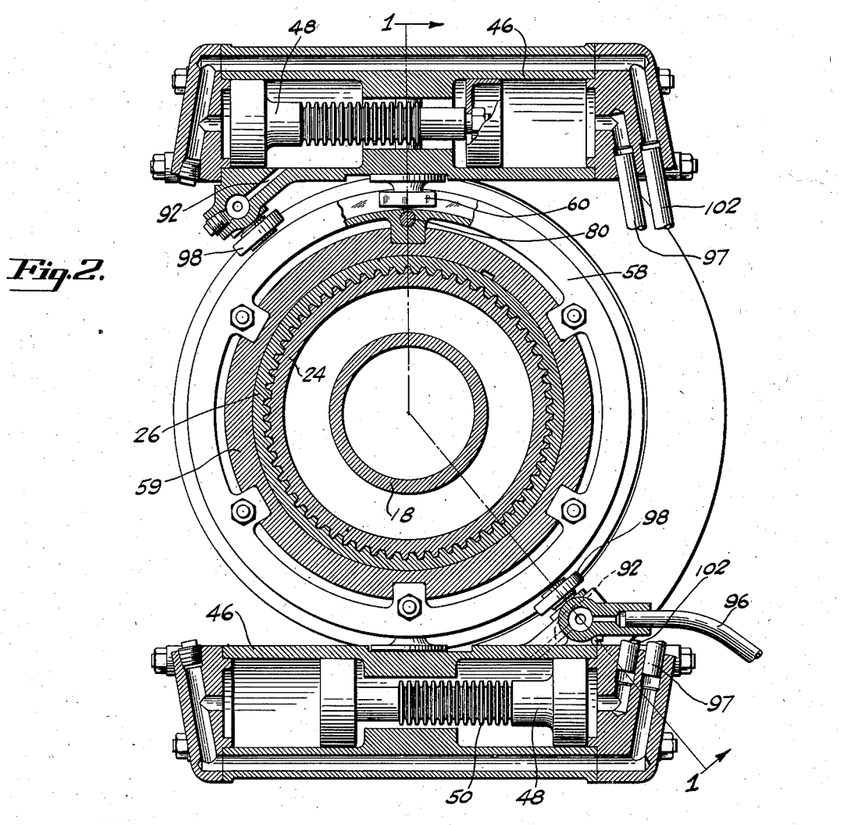
Fig. 2 is a transverse sectional view of the mechanism shown in Fig. 1, the section being taken on the planes of broken line 2—2 in Fig. 1.
Figures 10, 11:
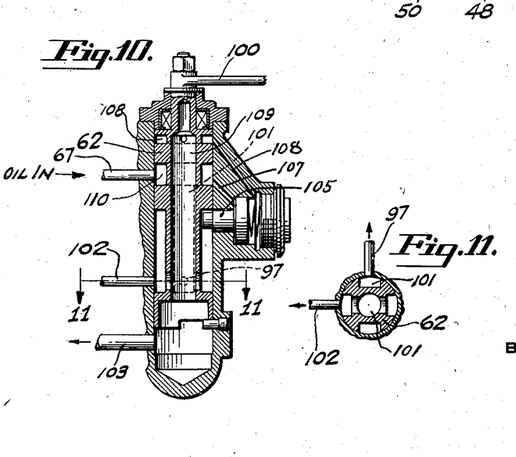
Fig. 10 is a longitudinal sectional view of the manually operated shifting valve for hydraulically effecting the changes in the driving connections for the propeller.
Fig. 11 is a cross-sectional view taken on the plane of line 11—11 in Fig. 10, and Figs. 12 to 17 are generally similar views showing parts of the shifting mechanism in successively different operative positions.

The manual control valve 62 for initiating operation of the shifting mechanism may be located on the housing 22 and actuated by a lever 100 and control rod (not shown) extending to the cockpit of the airplane. Normally, fluid under pressure (such as engine oil) may be supplied constantly to one end of each of the cylinders 46 as by conduits 97 so that the actuating member 58 will be held in its left hand position and connections will be maintained for the lower speed ratio of the propeller. Figs. 10 and 11 show the valve 62 in the position in which oil under pressure is admitted through conduit 67 to a circumferential groove 95 in valve 62, to a longitudinal groove 101 and thence to conduit 97. This actuates the pistons 48 to the position shown in Fig. 2. In this position of valve 62 conduit 102 is open to the drain 103 to permit fluid to exhaust from the opposite ends of cylinders 46. By rotating valve 62 to admit fluid under pressure to conduits 102 shown in Fig. 2 and simultaneously open the conduits 97 to drain 103, the pistons 48 will be moved to the opposite ends of their cylinders and will change the speed ratio as above described. This control of the fluid to move the actuating member 58 may be effected entirely by manual operating of the valve 62 from the cockpit.

A spring pressed plunger 105 is mounted in the casing for valve 62 so that it normally engages one of the longitudinal grooves in the valve and prevents rotation of valve when the engine is not running and no pressure exists in conduit 67. With pressure in conduit 67 and circumferential groove 95 fluid under pressure will be admitted to the valve end of the cylinder within which the plunger 105 operates. For this purpose a small conduit 107 is provided. This pressure serves to retract the plunger 105 and permit rotation of the valve 62. The opposite end of the cylinder for plunger 105 is connected by a small conduit 108 to a circumferential groove 110 formed in the upper end of valve 62 which is connected directly to the longitudinal recess 109 and to the drain 103.

It is to be understood that the invention is not limited to the specific embodiment herein illustrated and described, but may be used in other ways without departure from the spirit of the invention as defined by the following claims.

I claim:

1. A two-speed drive for aircraft propellers comprising in combination, an engine shaft mounted for rotation within an engine frame, a sleeve secured thereto, gears mounted on said sleeve concentric with said shaft, a plurality of shafts mounted in said engine frame and each having pinions thereon respectively engaging said gears, a propeller shaft concentric with said engine shaft, driving connections between said pinion carrying shafts and said propeller shaft, a ring member slidably mounted within said gears for drivingly connecting either of said gears with said sleeve, a crank member for moving said ring member into driving engagement with one or the other of said gears, and hydraulic means to actuate said crank member.

2. A two speed drive for aircraft propellers comprising in combination, an engine shaft mounted for rotation within an engine frame, a sleeve secured thereto, gears mounted for rotation relative to said sleeve concentric with said shaft, a plurality of shafts mounted in said engine frame and each having pinions thereon respectively engaging said gears, a propeller shaft concentric with said engine shaft, driving connections between said pinion carrying shafts and said propeller shaft, a ring member slidably mounted within said gears for drivingly connecting either of said gears with said sleeve, a crank member for moving said ring member into driving engagement with one or the other of said gears, and means to actuate said crank member approximately one half a revolution to move said ring member from one operative position to the other.

3. A two speed drive for aircraft propellers comprising in combination, an engine shaft mounted for rotation within an engine frame, a sleeve secured thereto, gears mounted on said sleeve concentric with said shaft, a plurality of shafts mounted in said engine frame and each having pinions thereon respectively engaging said gears, a propeller shaft concentric with said engine shaft, driving connections between said pinion carrying shafts and said propeller shaft, a ring member slidably mounted within said gears to limiting positions in either direction to form interconnecting means between one of said gears and said sleeve in either position, and means for moving said ring member to its opposite limiting positions.

4. A two speed drive for aircraft propellers comprising in combination, an engine shaft mounted for rotation within an engine frame, a sleeve secured thereto, gears mounted on said sleeve concentric with said shaft, a plurality of shafts mounted in said engine frame and each having pinions thereon respectively engaging said gears, a propeller shaft concentric with said engine shaft, driving connections between said pinion carrying shafts and said propeller shaft, a ring member slidably mounted within said gears and forming interconnecting means respectively between each of said gears and sleeve, a crank member for moving said member into driving engagement with one or the other of said gears, a piston connected to said crank member, and hydraulic means to actuate said piston to rotate said crank member to opposite positions.

5. A two-speed reduction drive for aircraft propellers comprising in combination, a drive shaft, a propeller shaft driven thereby, gear connections between said drive and propeller shafts, a shifting member in said connections movable to two alternately operative positions, an actuator for said shifting member, said actuator having first and second operative positions, a hydraulic piston movable within a cylinder to effect shifting movements of said actuating member from one to the other of said positions, a port overrun by said piston during movement in one direction, and means to supply fluid under pressure through said port to a propeller speed governor resetting valve operatively associated with said shifting member.

6. In a change speed drive for an aircraft propeller having a speed governor, a driving shaft, a pair of alternatively usable gears, a shifting member selectively engaging one or the other of said gears to drivingly connect one of said connected gears to drive said propeller from said shaft, actuating means for moving said shifting member to either position, means for preventing engagement of said shifting member with said gears except when their speeds are approximately equal, pressure means to effect movement of said shifting member, and valve means operated by movement of said actuating means to admit fluid under pressure to the propeller speed governor during movement of said slidable member.

7. In a change speed drive for an aircraft propeller having a speed governor, a driving shaft, a pair of alternatively usable gears for driving said propeller from said shaft in different gear ratios, a shifting member for selectively engaging one or the other of said gears with said driving shaft, a propeller speed governor resetting valve, and an actuating member having first and second operative positions effective upon movement from one to the other of said operative positions to operate said valve and move said shifting member out of engagement with one of said gears and into engagement with the other of said gears.

8. In a change speed drive for an aircraft propeller having a speed governor, a driving shaft, a pair of alternatively usable gears for driving said propeller from said shaft in different gear ratios, a shifting member for selectively engaging one or the other of said gears with said driving shaft, a propeller speed governor resetting valve, an actuating member resiliently connected to said shifting member and having first and second operative positions effective upon movement from one to the other of said positions to move said shifting member out of engagement with one of said gears and into engagement with the other of said gears, and means actuated by said shifting member for operating said valve.

9. In a change speed drive for an aircraft propeller having a speed governor, a driving shaft, a pair of alternatively usable gears for driving said propeller from said shaft in different gear ratios, a shifting member for selectively engaging one or the other of said gears with said driving shaft, a propeller speed governor resetting valve, an actuating member having first and second operative positions effective upon movement from one to the other of said positions to move said shifting member out of engagement with one of said gears and into engagement with the other of said gears, means for preventing engagement of said slidable member with said other gear except when their speeds are approximately equal, and means operated by movement of said shifting member into engagement with said other gear for actuating said valve.

JOHN STEPHEN HASBROUCK.

REFERENCES CITED

The following references are of record in the file of this patent:

UNITED STATES PATENTS

| Number | Name | Date |
|---|---|---|
| 1,046,440 | Chalmers | Dec. 10, 1912 |
| 1,720,989 | Ahlm | July 16, 1929 |
| 1,898,190 | Kohler | Feb. 21, 1933 |
| 1,935,965 | Wahlberg | Nov. 21, 1933 |
| 2,276,862 | Peterson et al. | Mar. 17, 1942 |
| 2,360,976 | Peterson et al. | Oct. 24, 1944 |
| 2,397,883 | Peterson et al. | Apr. 2, 1946 |
| 2,398,407 | Brownyer | Apr. 16, 1946 |
| 2,402,343 | Price | June 18, 1946 |